United States Patent [19]

Schneider et al.

[11] 4,358,162
[45] Nov. 9, 1982

[54] WHEEL HAVING BUILT-IN HUB

[75] Inventors: Jerry M. Schneider, Highland Park; Ronald A. Coules, Barrington, both of Ill.

[73] Assignee: Unarco Industries, Inc., Chicago, Ill.

[21] Appl. No.: 287,994

[22] Filed: Jul. 29, 1981

Related U.S. Application Data

[63] Continuation of Ser. No. 107,496, Dec. 26, 1979, abandoned.

[51] Int. Cl.³ .............................................. B60B 1/06
[52] U.S. Cl. .................................... 301/63 R; 46/221; 301/63 PW; 301/63 DS; 301/122
[58] Field of Search .................. 301/11 R, 18, 63 DS, 301/63 R, 63 DD, 63 DT, 63 PW, 86, 87, 89, 99, 111, 120, 122; 16/45; 46/201, 221; 295/21, 22

[56] References Cited

U.S. PATENT DOCUMENTS

| | | | |
|---|---|---|---|
| 1,540,508 | 6/1925 | White | 301/122 |
| 2,921,344 | 1/1960 | Carrico | 301/63 DD |
| 3,695,728 | 10/1972 | Haussels | 301/63 PW |
| 3,730,594 | 5/1973 | Zbikowski | 301/63 PW |

FOREIGN PATENT DOCUMENTS

| | | | |
|---|---|---|---|
| 965560 | 6/1957 | Fed. Rep. of Germany | 46/221 |
| 1114244 | 5/1968 | United Kingdom | 16/45 |

Primary Examiner—H. Grant Skaggs
Attorney, Agent, or Firm—Dressler, Goldsmith, Shore, Sutker & Milnamow, Ltd.

[57] ABSTRACT

A wheel is disclosed that has a built-in hub for receiving an axle. The wheel includes an annular outer rim, and a pair of circular webs that are received in the rim.

Each of the webs includes an inner annular ring. The annular ring on one of the webs defines a through-passageway, and the annular ring on the other web defines an aperture having an open end that communicates with the passageway and an opposite closed end. The closed end of the other web is defined by a wall of the other web. The wall of the other web, together with the annular ring on the other web, define a built-in hub for limiting insertion of the axle onto the wheel and for covering the axle. The need for a separate hub component that can fall off and become lost is thereby eliminated.

12 Claims, 1 Drawing Figure

U.S. Patent
Nov. 9, 1982
4,358,162
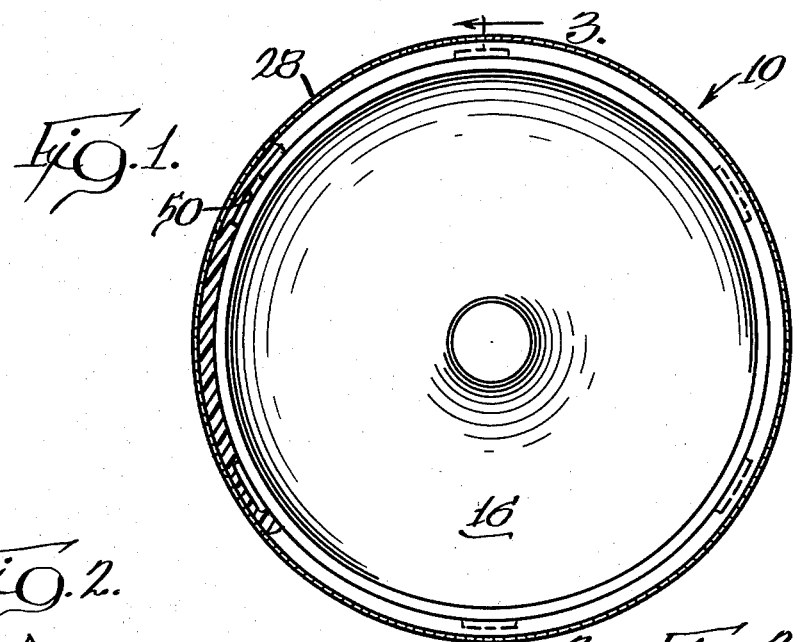
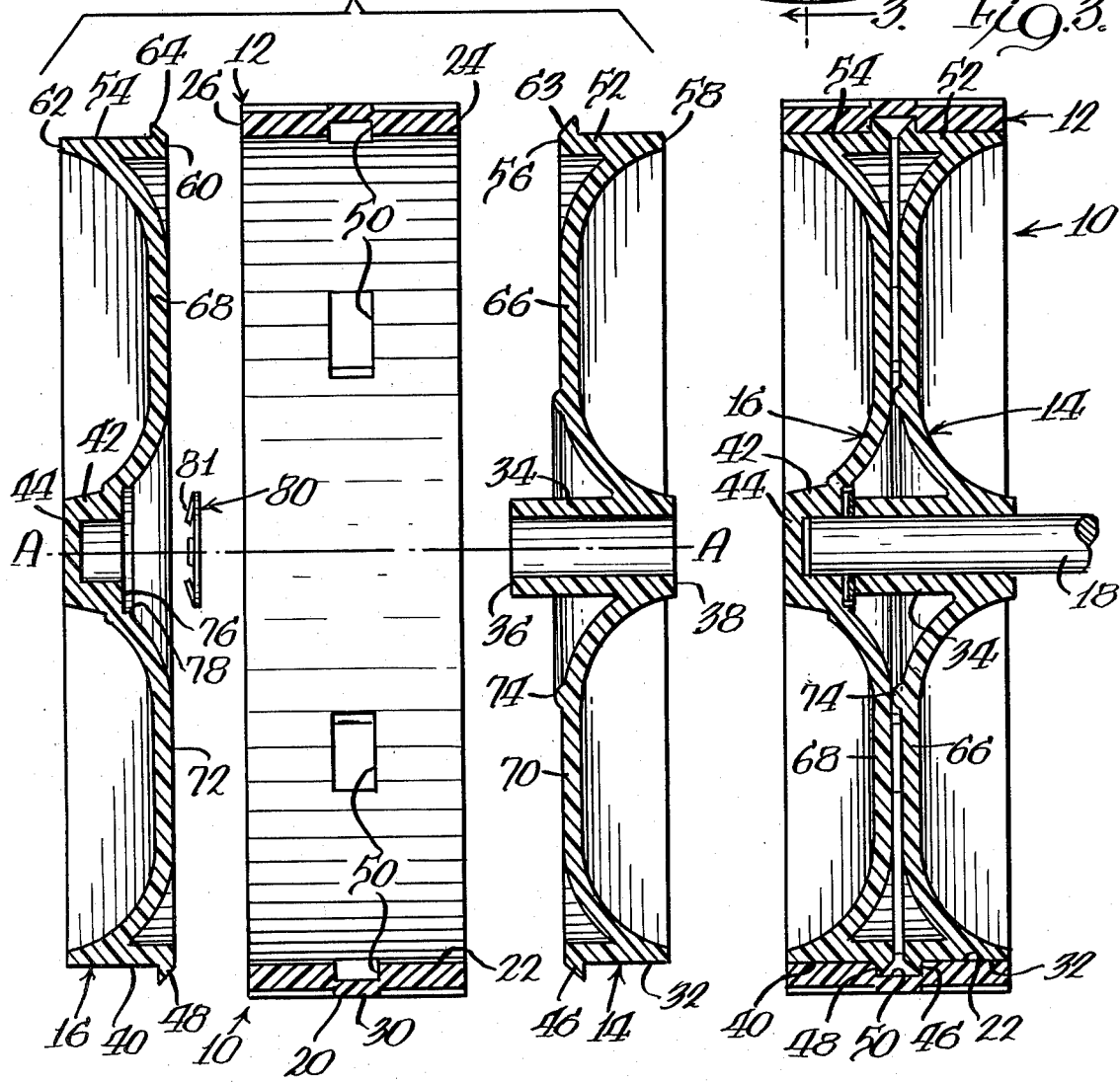

4,358,162

WHEEL HAVING BUILT-IN HUB

This is a continuation of application Ser. No. 107,496 filed Dec. 26, 1979 now abandoned.

DESCRIPTION

1. Technical Field

This invention relates to a wheel having a built-in hub for receiving an axle.

2. Background of the Invention

There is a need for relatively small wheels that can be manufactured relatively inexpensively and which have sufficient strength to effectively function over a period of time for use in a variety of applications, such as barbeque grills, lawn mowers, toys and carts.

One of the problems with prior art wheels is the need for a separate hub component for covering the end of the axle. The separate hub component adds to the expense of the wheel, and is usually a small component that can fall off of the wheel and become lost.

SUMMARY OF THE INVENTION

The present invention overcomes the problem of prior art wheels by providing a wheel having a built-in hub for limiting the insertion of an axle and covering the end of the axle.

The wheel includes an annular outer rim that has an outside surface, an inside surface, and a pair of sides. The rim defines an opening having an axis extending therethrough.

A first circular disk or web is received in the outer rim. The first web has an outside circumferential surface that engages the inside surface of the rim. The first web has an inner annular ring that defines a passageway that extends between a pair of opposing open ends and has an axis extending through the center of the first web.

A second circular disk or web is received in the rim. The second web has an outside circumferential surface that engages the inside surface of the outer rim. The second web has an inner annular ring that defines an aperture having an axis at the center of the second web. The aperture has an axis coinciding with the axis through the passageway in the first web and the opening in the outer rim. The second web has a wall that defines a closed end of the aperture, and the aperture also has an open end. The aperture in the second web communicates with the passageway in the first web.

Means is provided for mounting the first web and the second web to the outer rim. The mounting means comprises male means on the first web and the second web that is engageable with female means on the outer rim.

The axle is received within the annular rings defined by the first web and the second web. Fastening means is positioned between the open end of the first web and one of the open ends of the second web for engaging the axle and retaining the axle in position on the wheel.

In accordance with the foregoing arrangement, the annular ring on the second web together with the wall that defines the closed end of the aperture comprises a hub for the wheel, and are a portion of the second web that provides radial strength for the wheel.

BRIEF DESCRIPTION OF THE DRAWING

FIG. 1 is a side elevational view of the wheel of the present invention, partially broken away to show interior detail;

FIG. 2 is an enlarged exploded cross-sectional view of the wheel of the present invention; and FIG. 3 is an enlarged cross-sectional view of the assembled wheel of the present invention taken along plane 3—3 in FIG. 1.

DESCRIPTION OF THE PREFERRED EMBODIMENT

While this invention is susceptible of embodiment in many different forms there is shown in the drawing and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

Referring to the FIGURES, a wheel having a built-in hub for receiving an axle is shown. The wheel, which is designated generally as 10, includes an annular outer rim 12, and a pair of circular webs or disks 14 and 16 that are received in the outer rim and provide radial strength for the wheel. A shaft or axle 18 (FIG. 3) is received in the wheel, as described in detail below. The outer rim 12 and the webs 14 and 16 may be formed of polypropylene or other suitable materials, and these components of the wheel are preferably formed by an injection molding process.

As best shown in FIG. 2, the outer rim 12 is a cylindrical, hollow member having an outside surface 20, an inside surface 22, a front side 24 and a back side 26. The inside surface 22 of the outer rim defines an opening having an axis A—A extending through the rim.

The outer rim 12 includes tread means 28 (FIG. 1) that comprises a plurality of axially oriented spaced-apart ribs which define a plurality of axially oriented spaced-apart grooves between the ribs. The tread means preferably is integral with the outer rim. The outer rim also includes a circumferential band or projection 30 (FIG. 2) along a mid-portion of the outer surface 20 of the outer rim. The projection 30 provides a circumferentially oriented tread which minimizes the noise produced by the wheel when the wheel is rolling.

The web 14 is disposed radially inwardly of the outer rim 12, and is received in the outer rim, as depicted in FIG. 3. The web 14 has an outside circumferential surface 32 that is juxtaposed to and in surface-to-surface engagement with the inner surface 22 of the rim 12. The web 14 has an inner annular ring 34 that defines a passageway which extends between a pair of opposing open ends 36 and 38 (FIG. 2). Axis A—A extends through the center of the web 14.

Similarly, the web 16 is positioned radially inwardly of outer rim 12 and is received in the outer rim. The web 16 has an outside circumferential surface 40 that is juxtaposed to and in surface-to-surface engagement with the inner surface 22 of the rim 12. The web 16 has an inner annular ring 42 that defines an aperture having axis A—A at the center of the web 16. The web 16 has a wall 44 that is perpendicular to the axis A—A, extends inwardly from one end of annular ring 42, and defines a closed end of the aperture defined by the annular ring 42. The aperture also has an opposite open end, and communicates with the passageway defined by the annular ring 34 in the web 14. The axes through the opening in the outer rim 12, the passageway defined by the annular ring 34, and the aperture defined by the annular ring 42, coincide.

Means is provided for mounting the webs 14 and 16 to the outer rim 12. The mounting means comprises male means on the webs 14 and 16 which are engageable with female means on the outer rim 12. As shown in FIGS. 2 and 3, the male means comprises tabs 46 and 48 that project radially outwardly from the outside surface 32 and 40 of the webs 14 and 16, respectively. The female means comprises slot means 50 extending radially inwardly into the inside surface 22 of the outer rim 12. As explained in greater detail below, the tabs 46 and 48 are lockably receivable in the slot 50.

The webs 14 and 16 preferably each have an outer annular ring 52 and 54, respectively, that are concentric with the inner rings 34 and 42 and which define the outer surfaces 32 and 40 of the webs, as illustrated in FIG. 2. The annular ring 52 has an inner end 56 and an outer end 58, and the annular ring 54 has an inner end 60 and an outer end 62. The tabs 46 and 48 extend outwardly from the annular rings 52 and 54 along the inner ends 56 and 60 thereof. Preferably, the tabs 46 and 48 each have a beveled front edge 63 and 64, respectively. In the illustrated embodiment of the invention six of tabs 46 and 48 are provided at equally circumferentially spaced locations about rings 34 and 42, respectively.

The webs 14 and 16 are provided with thin walls 66 and 68 that extend between the outer annular rings 52 and 54, and the inner annular rings 34 and 42, respectively. The walls 66 and 68 are generally convex in shape, and have a generally flat central portion and curved outer portions having a predetermined radius of curvature. The generally convex shape of the walls 66 and 68 provides desirable strength for the webs 14 and 16, while minimizing the amount of material used in the webs. Wall 66 has an inner surface 70 that faces the inner surface 72 of wall 68.

The flat portion of one of the walls, such as wall 66 shown in FIG. 2, has a bead or rib 74 that protrudes outwardly from the inside surface thereof. The rib 74 is spaced-apart from outer ring 52 of the web 14 and the outside surface 32 thereof, and is adapted to engage the inside surface 72 of the wall 68 on the web 16. The rib 74 functions as a spacer means and assures that on opposite sides of the rib 74, the walls 66 and 68 of the webs 14 and 16 are spaced-apart by a distance at least as great as the height of the rib. The inner ends 56 and 60 of the outer annular rings 52 and 54 preferably are also spaced-apart by a distance at least as great as the height of the rib. The rib 74 facilitates the assembling of the wheel, as described hereinbelow.

The tabs 46 and 48 preferably comprise a plurality of spaced-apart tab segments positioned around the circumference of the webs 14 and 16. Correspondingly, the slot means 50 preferably comprises a plurality of recessed slot segments positioned around the circumference of the outer rim 12, as illustrated in FIG. 1.

As shown in FIG. 3, an axle 18 is received in the wheel within the inner annular rings 34 and 42 defined by the webs 14 and 16. Fastening means is provided, between the open end of the aperture in the web 16 and one of the open ends of the passageway in the web 14, for engaging the axle 18 and for retaining the axle in position within the passageway and the aperture in the wheel. The annular ring 42 terminates in a flat surface 76 (FIG. 2) that lies in a plane normal to the axis A—A. The surface 76 extends from the passageway defined by the annular ring 42 to an annular shoulder 78. The wall 76 is spaced-apart from wall 36 which also lies in a plane normal to the axis A—A and is at the inner end of annular ring 34 in the web 14. The wall 76 and shoulder 78 form a seat for receiving a fastener 80 (FIG. 2). The fastener has an opening through which the axle 18 is inserted, and inwardly facing tangs or tooth means 81 for biting into and gripping the axle to retain the axle in position on the wheel.

The assembling of the wheel is shown in FIGS. 2 and 3. Web 16 preferably is first slidably inserted into rim 12 from the back end 26 of the outer rim. The beveled edges 64 of the tabs 48 first engage the end 26 of the rim, and as the web 16 is moved axially relative to the rim, the tabs 48 flex the annular ring 54 inwardly as the tabs 48 move along the inside surface 22 of the rim. The web 16 is pushed inwardly until the tabs 48 snap into the slots 50, whereupon the annular ring 54 flexes outwardly and the web 16 is lockably secured in position on the outer rim. The fastener 80 is then positioned in the seat defined by the wall 76 and shoulder 78 in the web 16.

The web 14 is then similarly inserted into the rim 12 from the opposite end 24 of the rim until the rib 74 engages the wall 68. With continued pressure, the outer portion of the web 14 flexes about the fulcrum provided by the arcuate line of engagement between the rib 74 and the wall 68 until the tabs 46 are seated and lockably secured in the slots 50.

The web 14 is then released. After the web 14 is released, some tension remains in the webs 14 and 16 due to the opposing forces created by the engagement between the tabs 46 and 48 and the slots 50 along an outer portion of the wheel, and the engagement between the rib 74 and the wall 68 in a more inward position of the wheel. This construction assures a strong assembly, and minimizes tolerance problems in forming the webs 14 and 16 and the outer rim 12. The locking clip 80 is firmly and positively held in its seat by virtue of opposing surfaces 36 and 76 and surrounding shoulder 78.

The axle is then inserted into the annular rings 34 and 42 until the end of the axle approaches wall 44 and is engaged by the fastener 80.

It is preferable to insert the webs 14 and 16 into the outer rim 12 shortly after the rim is formed, and while it is still warm. It is easier to slide the webs into the rim while it is in the expanded, warm state. As the rim cools, it shrinks, thereby creating a tighter securement between the webs and the rim to minimize the possibility of the webs separating from the rim.

It can be seen from the foregoing that a portion of the web 16, namely the annular ring 42 and the wall 44, define a hub for the wheel that limits the insertion of the axle into the wheel and covers the end of the axle. This arrangement provides the function of a hub while eliminating the need for a separate hub component for the wheel.

From the foregoing, it will be observed that numerous variations and modifications may be effected without departing from the true spirit and scope of the novel concept of the invention. It is to be understood that no limitation with respect to the specific structure illustrated herein is intended or should be inferred. It is, of course, intended to cover by the appended claims all such modifications as fall within the scope of the claims.

I claim:

1. A wheel having a built-in hub for receiving a generally cylindrical portion of an axle, comprising
    an annular outer rim having an outside surface and an inside surface and a pair of sides, said rim defining an opening having an axis extending therethrough, a first circular web that is received in said outer rim, said first web having an outside circumferential surface that engages said inside surface of said rim, said first web having an inner annular ring that defines a passageway that extends between a pair of opposing open ends and has an axis extending through the center of said first web, a second circular web that is received in said rim, said second web having an outside circumferential surface that engages said inside surface of said outer rim, said second web having an inner annular ring that defines an aperture having an axis at the center of said second web, wherein said aperture has an axis coinciding with the axes through said passageway in said first web and said opening in said outer rim, said second web having a wall that defines a closed end of said aperture, said aperture also having an open end, and said aperture communicating with said passageway, means for mounting said first web and said second web to said outer rim, comprising male means on said first web and on said second web, and female means on said outer rin, said male means being engageable with said female means, said axle being received within said annular rings defined by said first web and said second web, said second web including an annular shoulder spaced radially from said aperture defining a cavity adjacent said aperture, and fastening means positioned in said cavity between said open end of said first web and one of the open ends of said second web for engaging said axle and retaining said axle in position within said annular rings, whereby said annular ring on said second web and said wall that defines the closed end of said aperture comprise a hub for said wheel, said hub limiting the insertion of said axle into said second web and covering an end of said axle, said fastening means comprising tooth means adapted to lockingly grip and retain said cylindrical position of said axle whereby said axle is retained within said hub by said fastening means as said axle is inserted into said hub and through said fastening means and said tooth means lockingly grip said cylindrical position.

2. A wheel as defined in claim 1 wherein said male means comprises tab means projecting radially outwardly from said outside surfaces of said first web and said second web, and said female means comprises slot means extending radially inwardly into said inside surface of said outer rim, said tab means being lockably receivable in said slot means.

3. A wheel having a built-in hub for receiving an axle, comprising a cylindrical hollow rim having an outside surface and an inside surface and a pair of sides, said rim defining an opening having an axis, a first disk that is received in said rim, said first disk having an outside circumferential surface that engages said inside surface of said rim, said first disk defining a passageway having an axis at the center of said first disk, wherein said passageway extends through said first disk and terminates at a pair of opposing open ends, a second disk that is received in said rim, said second disk having an outside circumferential surface, said second disk defining an aperture having an axis at the center of said second disk, wherein said aperture has an axis coinciding with the axes through said passageway in said first disk and said opening in said rim, said second disk having a wall that defines a closed end of said aperture, said aperture also having an open end, said aperture communicating with said passageway, said second disk including an annular shoulder spaced radially from said aperture defining a cavity adjacent said aperture, means for mounting said first disk and said second disk to said rim, said axle being received in said passageway in said first disk and said aperture in said second disk, and fastening means positioned between said open end of said second disk and one of the open ends of said first disk for engaging said axle and retaining said axle in position within said passageway and said aperture, whereby the portion of said second disk that define said aperture and said wall comprise a hub for said wheel, said hub limiting the insertion of said axle into said second disk and covering an end of said axle said fastening means comprising tooth means whereby said axle is insertable into said hub and through said fastening means and is lockingly gripped and retained within said hub by said tooth means.

4. A wheel as defined in claim 3 wherein said means for mounting said first disk and said second disk to said rim comprises male means on said first disk and said second disk, and female means on said rim, said male means being engageable with said female means.

5. A wheel as defined in claim 4 wherein said male means comprises tab means projecting radially outwardly from said outside surfaces of said first disk and said second disk, and said female means comprises slot means extending radially inwardly into said inside surface of said rim, said tab means being lockably receivable in said slot means.

6. A wheel as defined in claim 5 wherein said tab means comprises a plurality of spaced-apart tabs positioned around the circumference of said first disk and said second disk, and said slot means comprises a plurality of slots positioned around the circumference of said rim.

7. A wheel as defined in claim 3 wherein tread means is mounted to said rim and overlies the outer surface of said rim for engaging a surface upon which the wheel is rolled.

8. A wheel having a built-in hub for receiving an axle, comprising:

an annular outer rim having an outside surface and an inside surface and a pair of sides, said rim defining an opening having an axis extending therethrough, a first circular web that is received in said outer rim, said first web having an outside circumferential surface that engages said inside surface of said rim, said first web having an inner annular ring that defines a passageway that extends between a pair of opposing open ends and has an axis extending through the center of said first web, a second circular web that is received in said rim, said second web having an outside circumferential surface that engages said inside surface of said outer rim, said second web having an an inner annular ring that defines an aperture having an axis at the center of said second web, wherein said aperture has an axis coinciding with the axes through said passageway in said first web and said opening in said outer rim, said second web having a wall that defines a closed end of said aperture, said aperture also having an open end, and said aperture communicating with said passageway, means for mounting said first web and said second web to said outer rim, comprising male means on said first web and on said second web, and female means on said outer rim, said male means being engageable with said female means, wherein said male means comprises tab means projecting radially outwardly from said outside surfaces of said first web and said second web, and said female means comprises slot means extending radially inwardly into said inside surface of said outer rim, said tab means being lockably receivable in said slot means, said first web having a wall extending between said inner annular ring on said first wall and said outside circumferential surface of said first web, and said second web has a wall extending between said inner annular ring on said second web and said outside circumferential surface of said second web, said walls each have an inside surface that faces the inside surface of the wall on the other web, the wall on one of said webs having rib means protruding outwardly from the inside surface thereof, said rib means being spaced from the outside surface of said one web and adapted to engage the inside surface of the wall on the other web, whereby one of said webs is mounted to said outer rim by sliding within said outer rim until said tab means is received in said slot means, and the other of said webs is mounted to said outer rim by sliding within said outer rim until there is engagement between said rib means and the wall of the other web, whereupon the outer portion of the other web flexes about the points of engagement between said rib means and said wall on the other web until said tab means on said other web is received in said slot means, said axle being received within said annular rings defined by said first web and said second web, and fastening means positioned between said open end of said first web and one of the open ends of said second web for engaging said axle and retaining said axle in position within said annular rings, whereby said annular ring on said second web and said wall that defines the closed end of said aperture comprise a hub for said wheel, said hub limiting the insertion of said axle into said second web and covering an end of said axle.

9. A wheel having a built-in hub for receiving an axle, comprising a cylindrical hollow rim having an outside surface and an inside surface and a pair of sides, same rim defining an opening having an axis, a first disk that is received in said rim, said first disk having an outside circumferential surface that engages said inside surface of said rim, said first disk defining a passageway having an axis at the center of said first disk, wherein said passageway extends through said first disk and terminates at a pair of opposing open ends, a second disk that is received in said rim, said second disk having an outside circumferential surface, said second disk defining an aperture having an axis at the center of said second disk, wherein said aperture has an axis coinciding with the axes through said passageway in said first disk and said opening in said rim, said second disk having a wall that defines a closed end of said aperture, said aperture also having an open end, said aperture having a closed end and an open end, said aperture communicating with said passageway, means for mounting said first disk and said second disk to said rim, said mounting means comprising male means on said first disk and said second disk, and female means on said rim, said male means being engageable with said female means, said male means comprising tab means projecting radially outwardly from said outside surfaces of said first disk and said second disk, and said female means comprising slot means extending radially inwardly into said inside surface of said rim, said tab means being lockably receivable in said slot means, said first disk having a wall extending between said passageway and said outside circumferential surface of said first disk, and said second disk has a wall extending between said aperture and said outside circumferential surface of said second disk, said walls each have an inside surface that faces the inside surface of the wall on the other disk, the wall on one of said disks having rib means protruding outwardly from the inside surface thereof, said rib means being spaced from the outside surface of said one disk and adapted to engage the inside surface of the wall on the other disk, whereby one of said disks is mounted to said rim by sliding within said rim until said tab means is received in said slot means, and the other of said disks is mounted to said rim by sliding within said rim until there is engagement between said rib means and the wall of the other disk, whereupon the outer portion of the other disk flexes about the points of engagement between said rib means and said wall on the other disk until said tab means on said other disk is received in said slot means, said axle being received in said passageway in said first disk and said aperture in said second disk, and fastening means positioned between said open end of said first disk and one of the open ends of said second disk for engaging said axle and retaining said axle in position within said passageway and said aperture, whereby the portion of said second disk that define said aperture and said wall comprises a hub for said wheel, said hub limiting the insertion of said axle into said second disk and covering an end of said axle.

10. A wheel as defined in claim 9 wherein said rib means is provided on said first disk.

11. A wheel, comprising an annular outer rim having an outside surface and an inside surface and a pair of sides, said rim defining an opening having an axis extending therethrough, a first circular web that is received in said outer rim, said first web having an outside circumferential surface that engages said inside surface of said rim, a second circular web that is received in said rim, said second web having an outside circumferential surface that engages said inside surface of said outer rim, means for mounting said first web and said second web to said outer rim, comprising male means on said first web and on said second web, and female means on said outer rim, said male means being engageable with said female means, wherein said male means comprises tab means projecting radially outwardly from said outside surfaces of said first web and said second web, and said female means comprises slot means extending radially inwardly into said inside surface of said outer rim, said tab means being lockably receivable in said slot means, said first web having a wall extending generally radially inwardly from said outside circumferential surface of said first web, and said second web has a wall extending generally radially inwardly from said outside circumferential surface of said second web, said walls each have an inside surface that faces the inside surface of the wall on the other web, the wall on one of said webs having rib means protruding outwardly from the inside surface thereof, said rib means being spaced from the outside surface of said one web and adapted to engage the inside surface of the wall on the other web, whereby one of said webs is mounted to said outer rim by sliding within said outer rim until said tab means is received in said slot means, and the other of said webs is mounted to said outer rim by sliding within said outer rim until there is engagement between said rib means and the wall of the other web, whereupon the outer portion of the other web flexes about the points of engagement between said rib means and said wall on the other web until said tab means on said other web is received in said slot means.

12. A wheel, comprising a cylindrical hollow rim having an outside surface and an inside surface and a pair of sides, same rim defining an opening having an axis, a first disk that is received in said rim, said first disk having an outside circumferential surface that engages said inside surface of said rim, a second disk that is received in said rim, said second disk having an outside circumferential surface that engages said inside surface of said rim, means for mounting said first disk and said second disk to said rim, said mounting means comprising male means on said first disk and said second disk, and female means on said rim, said male means being engageable with said female means, said male means comprising tab means projecting radially outwardly from said outside surfaces of said first disk and said second disk, and said female means comprising slot means extending radially inwardly into said inside surface of said rim, said tab means being lockably receivable in said slot means, said first disk having a wall extending generally radially inwardly from said outside circumferential surface of said first disk, and said second disk has a wall extending generally radially inwardly from said outside circumferential surface of said second disk, said walls each have an inside surface that faces the inside surface of the wall on the other disk, the wall on one of said disks having rib means protruding outwardly from the inside surface thereof, said rib means being spaced from the outside surface of said one disk and adapted to engage the inside surface of the wall on the other disk, whereby one of said disks is mounted to said rim by sliding within said rim until said tab means is received in said slot means, and the other of said disks is mounted to said rim by sliding within said rim until there is engagement between said rib means and the wall of the other disk, whereupon the outer portion of the other disk flexes about the points of engagement between said rib means and said wall on the other disk until said tab means on said other disk is received in said slot means.

* * * * *